(12) United States Patent
Lemmers, Jr.

(10) Patent No.: US 8,203,316 B2
(45) Date of Patent: Jun. 19, 2012

(54) EDDY CURRENT TORSIONAL DAMPER FOR GENERATOR

(75) Inventor: Glenn C. Lemmers, Jr., Loves Park, IL (US)

(73) Assignee: Hamilton Sundstrand Corporation, Rockford, IL (US)

(*) Notice: Subject to any disclaimer, the term of this patent is extended or adjusted under 35 U.S.C. 154(b) by 653 days.

(21) Appl. No.: 12/317,051

(22) Filed: Dec. 18, 2008

(65) Prior Publication Data
US 2010/0156360 A1   Jun. 24, 2010

(51) Int. Cl.
*F16F 15/18*   (2006.01)
*H02K 49/04*   (2006.01)
*H02K 7/02*   (2006.01)
*H02K 7/104*   (2006.01)

(52) U.S. Cl. .............. 322/4; 74/574.1; 310/51; 310/74; 310/105; 322/40

(58) Field of Classification Search .............. 322/4, 40; 310/74, 79, 96, 105–107, 51; 74/574.1
See application file for complete search history.

(56) References Cited

U.S. PATENT DOCUMENTS
1,827,348 A   10/1931   Bing
(Continued)

FOREIGN PATENT DOCUMENTS
DE   19639104   * 4/1998
(Continued)

OTHER PUBLICATIONS

H. Razavi et al. "Eddy-Current Coupliing with Slotted Rotor Disk", IEEE Transactions on Magnetics, vol. 42, No. 3, pp. 405-410, Mar. 2006.*

(Continued)

*Primary Examiner* — Burton Mullins
(74) *Attorney, Agent, or Firm* — Kinney & Lange, P.A.

(57) ABSTRACT

A generator rotor torsional damper system includes a prime mover for generating rotational force, a generator stator, a generator rotor rotatably supported relative to the generator stator and configured to receive a rotational force input from the prime mover, a flywheel rotationally supported relative to the generator rotor by bearings, and an eddy current coupling operably connected between the flywheel and the generator rotor such that rotation of the generator rotor induces rotation of the flywheel in a common rotational direction through engagement by the eddy current coupling.

15 Claims, 4 Drawing Sheets

U.S. PATENT DOCUMENTS

| | | | |
|---|---|---|---|
| 2,246,232 A | 6/1941 | Almen | |
| 2,666,155 A * | 1/1954 | Kaplan | 310/105 |
| 2,769,932 A | 11/1956 | Zozulin et al. | |
| 3,458,122 A | 7/1969 | Andriussi et al. | |
| 4,036,584 A * | 7/1977 | Glass | 415/90 |
| 4,049,985 A * | 9/1977 | Sudler | 310/156.03 |
| 4,326,158 A * | 4/1982 | Helgesen | 322/4 |
| 4,339,780 A | 7/1982 | Okubo | |
| 4,377,780 A | 3/1983 | Bjorklund | |
| 4,444,444 A | 4/1984 | Benedetti et al. | |
| 4,463,306 A | 7/1984 | de Mello et al. | |
| 4,793,309 A | 12/1988 | Huffman et al. | |
| 4,855,664 A | 8/1989 | Lane | |
| 4,857,785 A | 8/1989 | McCarty | |
| 5,053,662 A | 10/1991 | Richter | |
| 5,105,928 A | 4/1992 | Saeki et al. | |
| 5,185,543 A * | 2/1993 | Tebbe | 310/51 |
| 5,260,642 A | 11/1993 | Huss | |
| 5,553,514 A | 9/1996 | Walkowc | |
| 5,558,495 A | 9/1996 | Parker et al. | |
| 5,664,534 A * | 9/1997 | Schmitz | 123/192.1 |
| 5,698,968 A | 12/1997 | Takagi et al. | |
| 5,714,820 A * | 2/1998 | Mitsuhashi et al. | 310/105 |
| 5,833,216 A | 11/1998 | Husmann | |
| 6,019,319 A | 2/2000 | Falbel | |
| 6,176,355 B1 | 1/2001 | Yamamoto | |
| 6,208,053 B1 * | 3/2001 | Scott | 310/105 |
| 6,209,692 B1 * | 4/2001 | Pels et al. | 188/381 |
| 6,232,686 B1 * | 5/2001 | Schneider | 310/77 |
| 6,278,196 B1 * | 8/2001 | Ehrhart et al. | 290/40 C |
| 6,328,142 B1 | 12/2001 | Kuwahara | |
| 6,337,561 B1 | 1/2002 | Sudou et al. | |
| 6,346,752 B1 * | 2/2002 | Osada et al. | 310/43 |
| 6,524,190 B1 | 2/2003 | Strauss | |
| 6,710,489 B1 | 3/2004 | Gabrys | |
| 6,903,529 B2 | 6/2005 | Kunzel et al. | |
| 7,129,593 B2 * | 10/2006 | King et al. | 290/4 C |
| 7,173,399 B2 | 2/2007 | Sihler et al. | |
| 7,423,357 B2 | 9/2008 | Takahashi et al. | |
| 7,584,685 B2 * | 9/2009 | Crist | 74/574.1 |
| 7,741,746 B2 * | 6/2010 | Groening | 310/106 |
| 2002/0046915 A1 | 4/2002 | Inoue et al. | |
| 2006/0244425 A1 | 11/2006 | Sihler | |
| 2007/0227470 A1 * | 10/2007 | Cole et al. | 123/3 |
| 2008/0238234 A1 | 10/2008 | Saban et al. | |
| 2009/0009129 A1 | 1/2009 | Markunas et al. | |
| 2009/0183959 A1 * | 7/2009 | Klit et al. | 188/267.1 |

FOREIGN PATENT DOCUMENTS

| | | |
|---|---|---|
| JP | 54099871 | 8/1979 |
| JP | 57018481 | 1/1982 |
| WO | 9622630 | 7/1996 |
| WO | 9847215 | 10/1998 |
| WO | 99/25579 * | 5/1999 |

OTHER PUBLICATIONS

"Eddy Current", publication name unknown, publication date unknown (faxed Feb. 4, 1994) (3 pages).

* cited by examiner

US 8,203,316 B2

EDDY CURRENT TORSIONAL DAMPER FOR GENERATOR

BACKGROUND

The present invention relates to torsional dampers.

Generators enable the conversion of mechanical energy from a prime mover into electrical energy, and are used in a variety of settings. For example, generators are commonly powered by gas turbine engines in order to generate electricity for an aircraft. With aerospace applications, gas turbine engines generally provide a variable speed rotational force that is input to a generator by means of suitable gearing.

Torsional instability, including that due to oscillations in rotational speed, is problematic for many generators. Torsional instability can contribute to fatigue failure of shafts and other mechanical components in the generator, prime mover, and any mechanical components linking the generator and prime mover. Many factors lead to torsional instability. For instance, known generators directly coupled to gas turbine engines typically produce relatively high torsional loads with little mechanical damping, and constant-power generator configurations also exhibit inversely proportional torque vs. speed curves (i.e., torque decreases with increasing operating speed). Changes in engine speed can produce relatively large oscillations in torque, resulting in large torsional oscillations experienced by generator components.

Active damping systems provided by generator controllers can provide generator torque oscillation damping, but at the undesirable cost of generator transient performance. Active damping can also require control hardware and control logic that add undesired complexity and cost. Mechanical spring-mass damper systems can also be used to dampen axial vibrations, but spring-mass damper systems must be tuned to relatively narrow frequency bands. Those factors reduce the effectiveness of spring-mass dampers with respect to generators that experience torque oscillations across a relatively wide frequency band.

Thus, an alternative torsional damper system for use with a generator is desired.

SUMMARY

A generator rotor torsional damper system according to the present invention includes a prime mover for generating rotational force, a generator stator, a generator rotor rotatably supported relative to the generator stator and configured to receive a rotational force input from the prime mover, a flywheel rotationally supported relative to the generator rotor by bearings, and an eddy current coupling operably connected between the flywheel and the generator rotor such that rotation of the generator rotor induces rotation of the flywheel in a common rotational direction through engagement by the eddy current coupling.

DETAILED DESCRIPTION

In general, the present invention provides a torsional damper with an eddy current coupling (also known as a hysteresis coupling) for passively, mechanically damping torsional instabilities in a generator system. More particularly, the torsional damper provides a flywheel rotatably supported on a rotor of the generator, with the eddy current coupling entraining the flywheel for common rotation with the generator rotor. When a prime mover (e.g., a gas turbine engine) rotates the rotor of the generator, the flywheel is rotated to approximately the same speed as that of the rotor. The flywheel acts as a repository of inertia. Rotational oscillations experienced by the rotor of the generator produce a reaction torque relative to the flywheel that tends to bring the flywheel and the rotor to a substantially synchronous speed. In this way, inertia can be added to or subtracted from the rotating flywheel to dampen rotational oscillations of the rotor during operation. The eddy current coupling can use permanent magnets and an eddy current conducting ring of material positioned in the magnetic fields of the permanent magnets to provide engagement, which allows for passive torsional dampening of the rotor.

Figure 1:
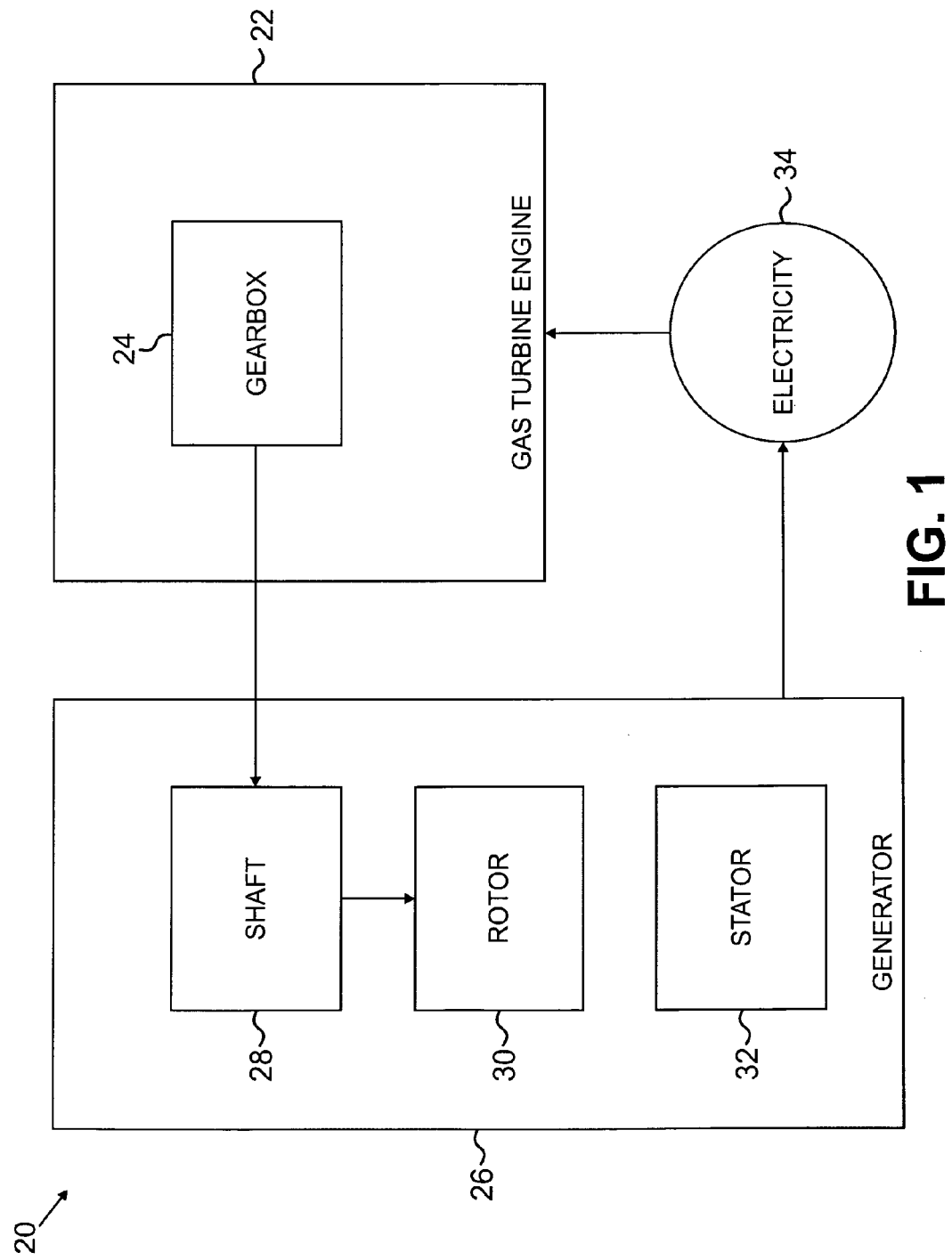
FIG. 1 is a block diagram of a generator system.

FIG. 1 is a block diagram of an embodiment of a generator system 20 that includes a gas turbine engine 22 (or other prime mover) with a gearbox 24, and a generator 26 including a shaft 28 (or drive shaft), a rotor 30 and a stator 32. The system 20 shown in FIG. 1 is greatly simplified. Those of ordinary skill in the art will appreciate that additional components not specifically shown can be included as desired with the system 20. Moreover, it is possible to have additional generators (not shown) powered by the gas turbine engine 22.

In operation, the gas turbine engine 22 generates a rotational force (i.e., torque) output, which is transmitted through the gearbox 24 (e.g., a conventional accessory gearbox) to the shaft 28 of the generator 26. The shaft 28, in turn, transmits torque to the rotor 30. Rotation of the rotor 30 in proximity to the stator 32 generates electricity 34 in a conventional manner, and the electricity 34 can be provided back to the gas turbine engine 22 or to other locations as desired.

The system 20 can be configured as a direct drive system for powering the generator 26. During operation, power transmitted from the gas turbine engine 22 to the generator 26 can produce torque oscillations on the rotor 30 (and associated components). These oscillations can be the result of numerous factors, such as changes in operational speed of the gas turbine engine 22. Torque oscillations tend to produce torsional oscillations. The present invention permits damping of torsional oscillations in the system 20.

Figure 2:
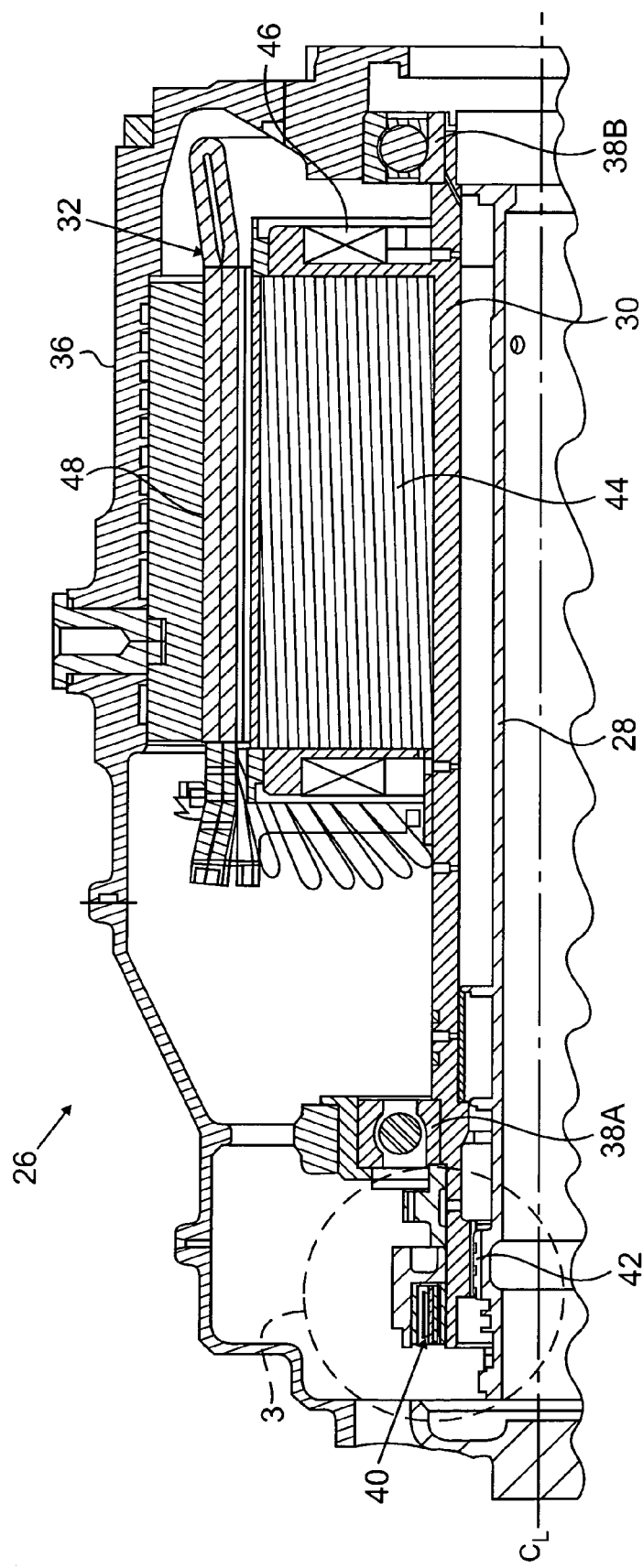
FIG. 2 is a partial cross-sectional view of a generator having a torsional damper according to the present invention.

FIG. 2 is a partial cross-sectional view of one embodiment of the generator 26, which includes the shaft 28, the rotor 30, the stator 32, a generally rotationally-fixed housing 36, bearings 38A and 38B, and a torsional damper assembly 40.

As shown in FIG. 2, the shaft 28 and the rotor 30 are arranged concentrically within the housing 36, with the shaft 28 positioned radially inward of the rotor 30. Both the shaft 28 and the rotor 30 are configured for rotation about a centerline $C_L$. The rotor 30 can be rotationally coupled to the shaft 28 with a splined connection 42 or other suitable connection, to enable the transmission of torque from the shaft 28 to the rotor 30.

The rotor 30 is supported on the housing 36 by the bearings 38A and 38B, with the shaft supported at least in part by the rotor 30. The rotor 30 carries a core 44 and a coil 46.

The stator 32 is mounted to the housing 36 and includes stator windings 48 positioned generally adjacent to the coil 46 on the rotor 30. Rotation of the coil 46 on the rotor 30 relative to the windings 48 on the stator 32 generates electricity 34.

It should be understood that the illustrated embodiment of the generator 26 is provided merely by way of example and not limitation. A variety of generator configurations are possible. Moreover, the generator 26 can include additional components (e.g., rectifiers, controllers, etc.) that are not shown. The present invention can be used with nearly any type of generator.

Figure 3:
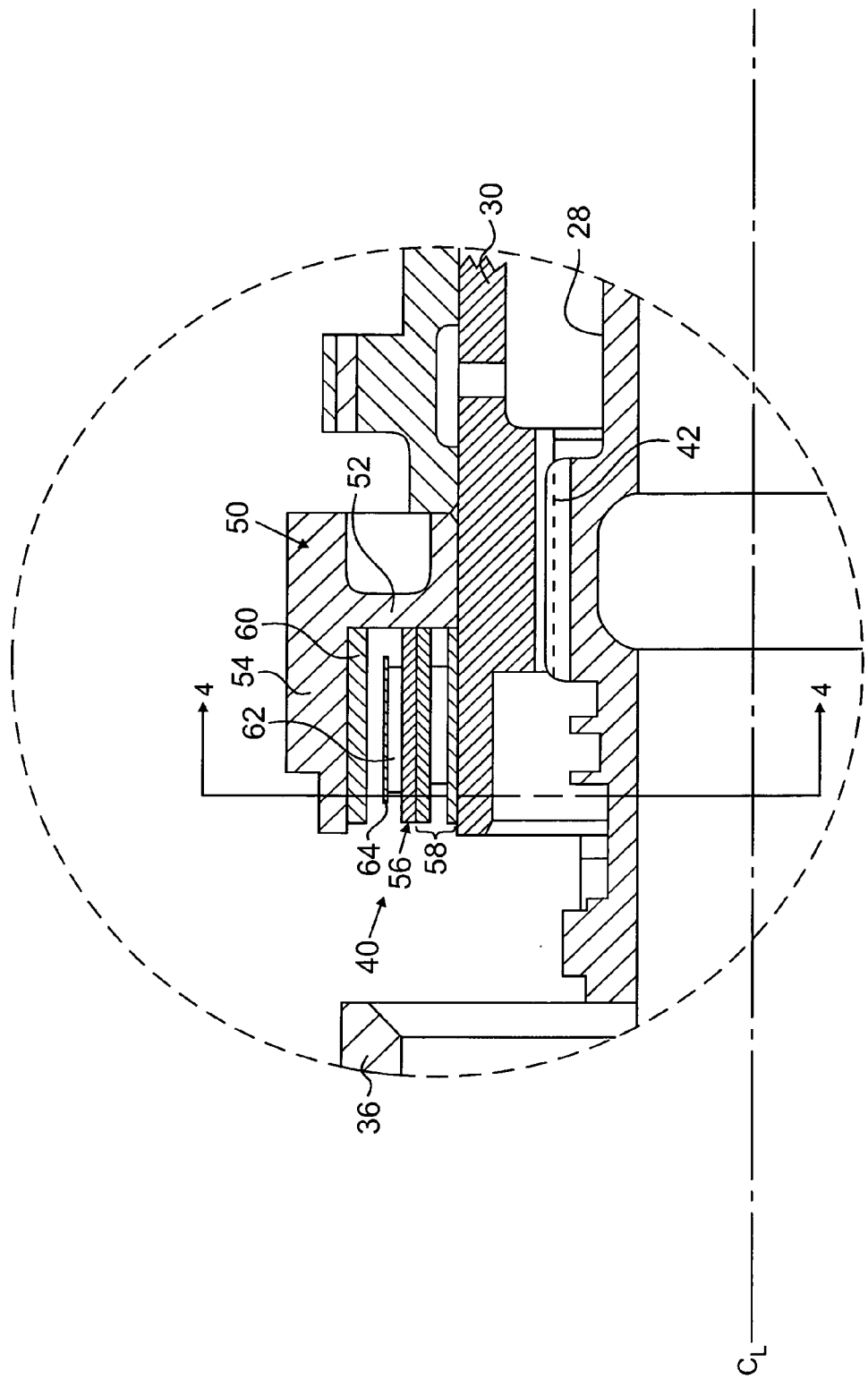
FIG. 3 is an enlarged cross-sectional view of region 3 of FIG. 2.
Figure 4:
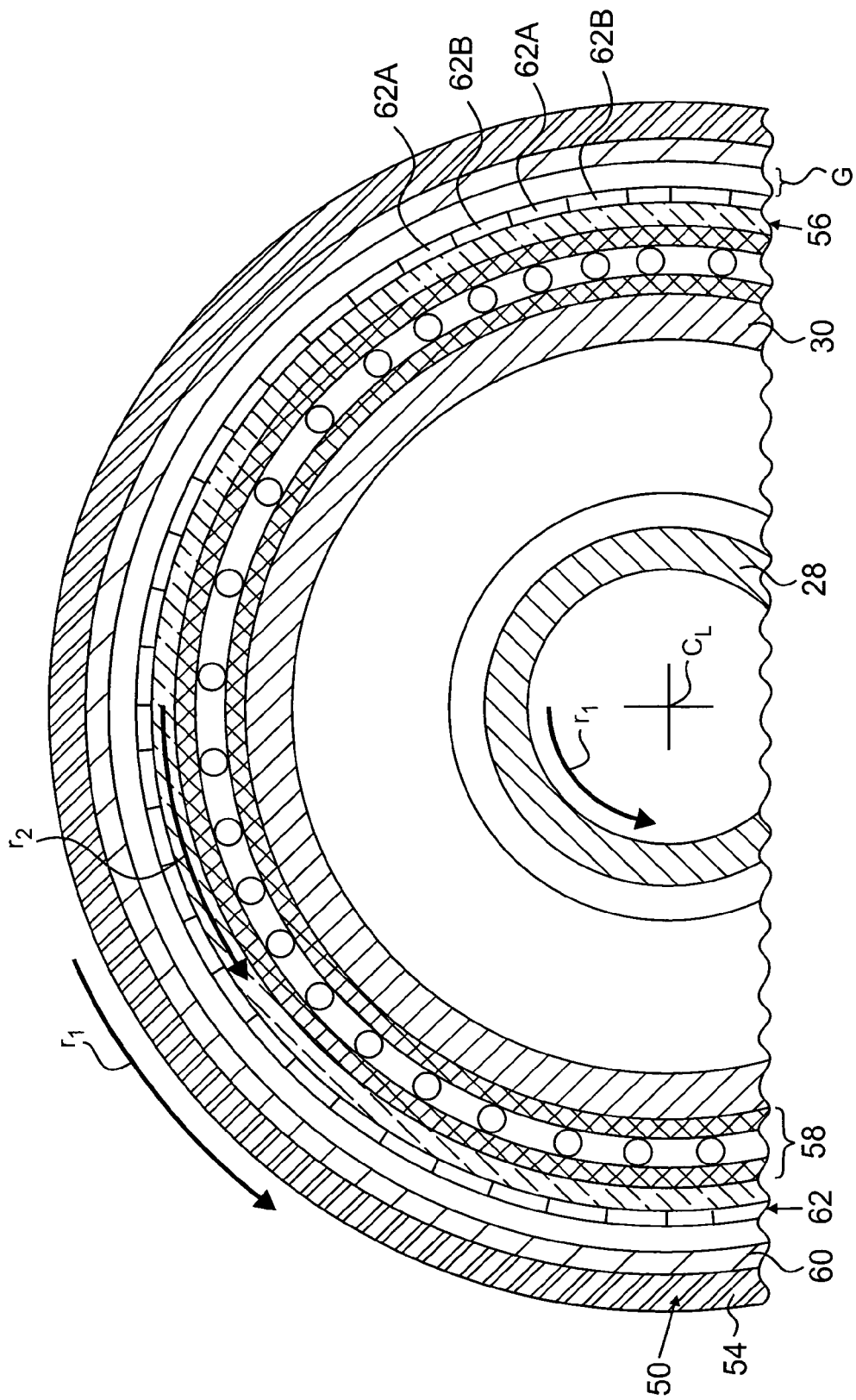
FIG. 4 is a cross-sectional view of a portion of the generator, taken along line 4-4 of FIG. 3.

FIG. 3 is an enlarged cross-sectional view of region 3 of FIG. 2, showing the torsional damper assembly 40 of the generator 26, and FIG. 4 is a cross-sectional view of a portion of the torsional damper assembly 40 of the generator 26, taken along line 4-4 of FIG. 3 (though some structures normally visible beyond the section line 4-4 are not shown in FIG. 4 for simplicity). As shown in FIGS. 3 and 4, a hub 50 is mounted to the rotor 30 and configured to rotate with the rotor 30. The hub 50 can be made of steel, and can be mounted concentrically and radially outward relative to the rotor 30. In the illustrated embodiment, the hub 50 includes a radial portion 52 and an axial-extending portion 54, with the radial portion 52 positioned in axial alignment with the splines 42.

A flywheel 56 is rotationally supported on the rotor 30 by bearings 58, allowing the flywheel 56 to rotate relative to the rotor 30. The bearings 58 can be roller bearings (as illustrated in FIGS. 2-4), a journal bearing, or other suitable bearing means. The flywheel 56 defines a mass, which can be rotated during operation of the generator 26 to store inertia. In the illustrated embodiment, the flywheel 56 is positioned adjacent to the hub 50, more specifically with the flywheel 56 positioned at least partially in a cavity defined between the radial portion 52 and the axially-extending portion 54 of the hub 50. The flywheel can be located radially inward of the axially-extending portion 54 of the hub 50.

An eddy current coupling is formed by a ring 60 and an array of permanent magnets 62. The ring 60 can be configured as a generally cylindrical sleeve, a "squirrel cage" (i.e., like the rotor of an alternating current induction motor), or other suitable shape, and can be made of an eddy current conducting material, such as a non-ferrous metallic material like copper.

The array of permanent magnets 62 can be made up of a plurality of circumferentially arranged permanent magnets of alternating polarities mounted on the flywheel 56. In other words, the permanent magnets can include a set of first permanent magnets 62A have a first arrangement of north and south poles, and a set of second permanent magnets 62B have a second arrangement of north and south poles generally opposite in polarity to that of the first arrangement. In one embodiment, the eddy current coupling is configured with the set of first permanent magnets 62A having radially outward facing north poles and the set of second permanent magnets 62B having radially outward facing south poles. Each of the permanent magnets in the array 62 is a rare-earth permanent magnet or other suitable magnet. Samarium-cobalt permanent magnets may be advantageous for certain applications because of their ability to function in relatively high temperature environments. The array of permanent magnets 62 is secured to the flywheel using fasteners (e.g., screws, bolts, etc.), adhesive, or other suitable means. The array of permanent magnets 62 can further be radially secured with a retaining band 64, which can be a relatively thin, circumferentially-extending band of material positioned radially outward from the array 62.

The ring 60 is positioned in a magnetic field of at least a portion of the array of permanent magnets 62. In the illustrated embodiment, the ring 60 is spaced from the array of permanent magnets 62 by a radial gap G. Other arrangements are possible in alternative embodiments, such as axially-facing configurations.

Although the illustrated embodiment depicts the eddy current coupling of the torsional damper assembly 40 with the array of permanent magnets 62 mounted to the flywheel 56 and the ring 60 mounted to the hub 50, the positions of those components can be reversed in further embodiments. For instance, the array of permanent magnets 62 can be mounted to the hub 50 and the ring 60 can be mounted to the flywheel 56.

During operation, the gas turbine engine 22 (or other prime mover) transmits torque to the shaft 28 of the generator 26 through the gearbox 24. The rotor 30 rotates synchronously with the shaft 28 at a given speed $r_1$. The eddy current coupling of the torsional damper assembly 40 entrains the flywheel 56 for rotation with the rotor 30 in a common rotational direction (clockwise or counterclockwise). The eddy current coupling causes the flywheel 56 to rotate at a speed $r_2$. During steady-state operation, the flywheel speed $r_2$ is approximately equal to the rotor speed $r_1$. The flywheel 56, by way of rotation of its mass, acts as a repository of inertia. Rotational oscillations experienced by the rotor 30 that vary the rotor speed $r_1$ over time produce a reaction torque through the eddy current coupling relative to the flywheel 56, which tends to return the flywheel 56 and the rotor 30 to substantially synchronous speeds. In this way, inertia is added to or subtracted from the rotating flywheel 56 to dampen rotational oscillations of the rotor 30 during operation and thereby control torsion on the rotor 30. The use of the array of permanent magnets 62 and the ring 60 of eddy current conducting material allows for passive torsional dampening of the rotor, without a need for controllers and without the parasitic power loss associated with electromagnetic coil eddy current drives. The torsional damper assembly 40 can dampen oscillations across a relatively broad band of oscillation frequencies, which provides for robust damping across unpredictable operational conditions. By providing torsional damping to the generator 26, stress and damage to generator components—particularly fatigue of the rotor 30, the shaft 28 and associated drivetrain components—is reduced. This helps prolong the useful life of such components, and reduce the need for replacement or repair of damaged parts. It should be noted that the torsional damper assembly 40 of the illustrated embodiment is not directly involved in the generation of electrical energy by the generator 26.

In some applications, torque oscillations on the rotor 30 will be relatively small in magnitude compared to the overall torque experienced by the generator 26. For instance, oscillations on the rotor 30 may be on the order of less than 0.75 kW (1 horsepower), while the generator may be many hundred horsepower, such as about 261 kW (350 horsepower). The mass of the flywheel 56 is selected to provide a suitable level of torsional damping to the rotor 30. In one embodiment, the flywheel 56 (and associated components rotating with it) has an inertia value of about 5% of an inertia value of the rotor 30 (and associated components rotating with it). In this context the inertia value is a value correlated to mass. Thus, the torsional damper of the present invention has a relatively small mass penalty when added to the generator 26.

Although the present invention has been described with reference to preferred embodiments, workers skilled in the art will recognize that changes may be made in form and detail without departing from the spirit and scope of the invention. For example, the particular location and shape of the torsional damper assembly of the present invention can vary as desired for particular applications. Furthermore, it is possible to provide one or more electromagnets in place of permanent magnets in an eddy current coupling according to the present invention.

The invention claimed is:

1. A generator rotor torsional damper system comprising:
a prime mover for generating rotational force;
a generator stator;
a generator rotor rotatably supported relative to the generator stator and configured to receive a rotational force input from the prime mover;
a flywheel rotationally supported relative to the generator rotor by bearings, the flywheel defining a mass;
a hub mounted radially outward relative to the generator rotor, wherein the generator rotor, the flywheel and the hub are arranged concentrically about a common axis; and
an eddy current coupling operably connected between the flywheel and the generator rotor such that rotation of the generator rotor induces rotation of the flywheel in a common rotational direction through engagement by the eddy current coupling, wherein the eddy current coupling comprises:
a plurality of circumferentially arranged permanent magnets mounted to the flywheel; and
a ring of non-ferrous eddy-current conducting material mounted to the hub in a magnetic field of at least a portion of the plurality of permanent magnets, wherein the ring is positioned radially outward of the flywheel.

2. The system of claim 1 and further comprising:
a containment band for radially securing the permanent magnets.

3. The system of claim 1 and further comprising:
a drive shaft operably connected between the prime mover and the generator rotor and positioned radially inward of the generator rotor concentric with the generator rotor, the flywheel and the hub about the common axis.

4. The system of claim 1, wherein the prime mover comprises a gas turbine engine.

5. The system of claim 1, wherein the eddy current coupling operates across a radial gap between the flywheel and the generator rotor.

6. The system of claim 1, wherein the flywheel defines a damper inertia value of approximately 5% of an inertia value defined by the generator rotor.

7. A damper assembly for use with a generator, the assembly comprising:
a generator rotor; and
an eddy current coupling comprising:
a flywheel ring rotatably supported relative to and radially outward from the generator rotor, the flywheel defining a mass;
a hub mounted on the generator rotor;
a plurality of permanent magnets supported by the flywheel ring; and
an eddy current material capable of conducting eddy currents supported by the hub radially outward from the flywheel, the plurality of permanent magnets arranged to generate eddy currents in the eddy current material, wherein the generator rotor, the flywheel and the hub are arranged concentrically about a common axis, and wherein rotation of the generator rotor induces rotation of the flywheel ring in a common rotational direction through engagement of the eddy current coupling, and wherein rotation of the flywheel ring provides torsional dampening to the generator rotor through engagement of the eddy current coupling.

8. The assembly of claim 7, wherein the eddy current material comprises copper.

9. The assembly of claim 7 and further comprising a bearing operatively engaged between the flywheel ring and the generator rotor to permit rotation therebetween, the bearing selected from the group consisting of a journal bearing and a roller bearing.

10. The assembly of claim 7 and further comprising:
a drive shaft operably connected to the generator rotor through a splined connection and positioned radially inward of the generator rotor concentric with the generator rotor, the flywheel and the hub about the common axis.

11. The assembly of claim 7 and further comprising:
a containment band for radially securing the permanent magnets.

12. The assembly of claim 7, wherein the eddy current material and the plurality of permanent magnets are spaced from one another radially.

13. The assembly of claim 7, wherein the plurality of permanent magnets are arranged in a circumferentially-extending array.

14. The assembly of claim 7, wherein the flywheel defines a damper inertia value of approximately 5% of an inertia value defined by the generator rotor.

15. A method for torsionally damping a rotor positioned adjacent to a stator, the method comprising:
rotating a rotor;
generating electrical energy through relative rotation of the rotor and the stator;
rotating a flywheel via a passive permanent magnet eddy current coupling between the flywheel and the rotor to approximately a rotational speed of the rotor, wherein the flywheel rotates in a common rotational direction with the rotor, and wherein the flywheel is rotatably supported on the rotor with a bearing; and
transferring torque across a radial gap between the flywheel and the rotor through the eddy current coupling to dampen torsional oscillations of the rotating rotor.

* * * * *